(12) United States Patent
Gammelsaeter

(10) Patent No.: US 7,320,718 B2
(45) Date of Patent: Jan. 22, 2008

(54) DEVICE FOR A CYCLONE SCRUBBER

(75) Inventor: Rune Gammelsaeter, Trondheim (NO)

(73) Assignee: Flow Dynamics AS, Trondheim (NO)

( * ) Notice: Subject to any disclaimer, the term of this patent is extended or adjusted under 35 U.S.C. 154(b) by 410 days.

(21) Appl. No.: 10/516,636

(22) PCT Filed: May 23, 2003

(86) PCT No.: PCT/NO03/00169

§ 371 (c)(1),
(2), (4) Date: Dec. 1, 2004

(87) PCT Pub. No.: WO03/103843

PCT Pub. Date: Dec. 18, 2003

(65) Prior Publication Data

US 2005/0172589 A1   Aug. 11, 2005

(30) Foreign Application Priority Data

Jun. 11, 2002  (NO) ................ 20022769

(51) Int. Cl.
*B01D 45/12* (2006.01)
(52) U.S. Cl. ................ 55/394; 55/456
(58) Field of Classification Search .......... 55/394, 55/396, 456, 457
See application file for complete search history.

(56) References Cited

U.S. PATENT DOCUMENTS 2,115,326 A * 4/1938 Bowen .................. 55/433

FOREIGN PATENT DOCUMENTS

| EP | 0203896 | 5/1986 |
|----|---------|--------|
| GB | 1127514 | 3/1967 |
| SE | 509685 | 2/1999 |
| WO | WO 98/46328 | 10/1998 |

* cited by examiner

*Primary Examiner*—Robert A. Hopkins
(74) *Attorney, Agent, or Firm*—Mathews, Shepherd, McKay & Bruneau, P.A.

(57) ABSTRACT

A device for an axial cyclone (1) of the kind which is used for separating a fluid from a gas, where the gas flowing through the axial cyclone (1), primarily in the axial direction of the axial cyclone (1) assigns a rotation around the centre axis (12) of the axial cyclone (1), and where the axial cyclone (1) comprises in the flow direction of the fluid an inlet pipe (2), a transitional part (4) and a downstream pipe (6) where the downstream pipe (6) is supplied with a cross-sectional area smaller than the cross-sectional area of the inlet pipe.

3 Claims, 1 Drawing Sheet

DEVICE FOR A CYCLONE SCRUBBER

Figure 1:
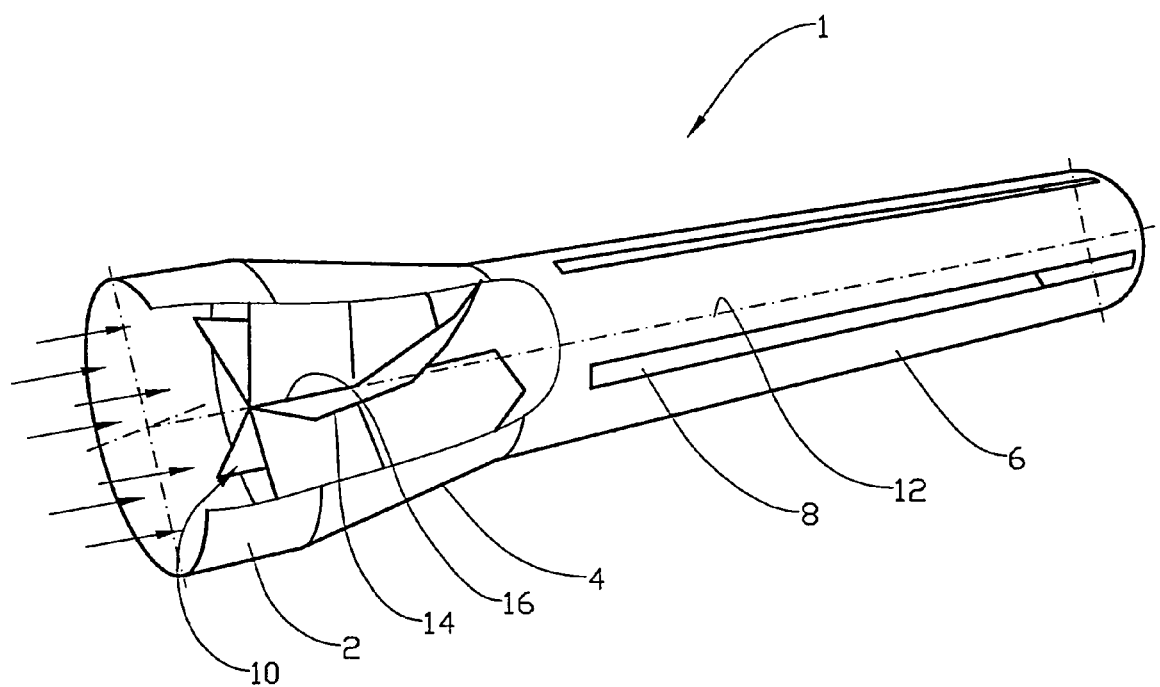

This invention concerns a cyclone scrubber. More precisely it concerns a cyclone of the kind which is used for separating out a fluid, preferably in the form of droplets, from a gas.

When separating fluid droplets from a gas or a gas mixture, for example water droplets from air or condensate from a petroleum gas, the size of the smallest droplets to be separated are determining for the efficiency of the separation process. It is also desirable that the separation is carried out with as little loss of pressure in the gas flow as possible, in that a pressure loss in a process most often causes a cost of energy.

Scrubbing a gas can advantageously be carried out by passing the gas which is to be cleaned, through a cyclone. It has been shown that so-called axial cyclones, where the gas flowing though a pipe primarily in the axial direction of the pipe, assigns a rotation around the centre axis of the pipe, are well suited for this purpose.

Axial cyclones in prior art are usually formed like a cylindrical pipe in which a rotational element is concentrically placed, comprising a cylindrical, preferably substantially drop-shaped body and several axial vanes distributed around the pipe axis, between the body and the internal surface of the pipe.

When gas flows in between the vanes, the velocity of flow increases due to the body's reduction of the cross-sectional area of the pipe, and due to the vanes the gas assigns a rotation around the axis of the pipe. The relative to the gas heavier fluid droplets are slung outwards by the centrifugal force towards the pipe mantel in the pipe downstream of the rotational element. The pipe of the cyclone can downstream the rotational element be equipped with longitudinal slots through which the fluid droplets can flow out.

The central body of the rotational element causes that the flow velocity of the gas nearest to the body decelerates. In this way, some of the droplets may be deposited on the body and will, due to low rotational speed, not be separated out downstream of the rotational element. This phenomenon is often called "fluid creep".

The common practice in accordance with prior art of placing a central body in the rotational element has demonstrated not being able to achieve the necessary degree of separation required for some applications.

The object of the invention is to overcome the disadvantages in prior art.

The object is achieved according to the invention by the features given in the description below and the following patent claims.

In accordance with the invention, the flowing gas is assigned the necessary acceleration by conically reducing the diameter of the cyclone pipe in the section at the rotational element from one diameter upstream of the inlet of the rotational element to a smaller diameter downstream of the outlet of the rotational element.

The rotational element according to the invention does not comprise any central body, in that the axial vanes distributed around the centre of the cyclone pipe join at the center of the rotational element. The rotational element itself thus reduces the cyclone's cross-sectional flow area only to an insignificant extent, and thereby contributes neither to an extent worth mentioning in reducing the flow velocity of the gas. In practice, the reduction of area does not exceed 20% of the cross-sectional flow area.

Some of the droplets that exist in the gas meet the conical part of the cyclone when flowing though the rotational element and are already there separated out from the fluid. Even if the droplets should remain attached to the conical part, they will, after flowing past the rotational element, escape out through the slots in the area downstream of the cyclone. Similarly, droplets depositing on the axial vanes will be pulled into the rotating gas and be slung out through the slots.

The reduction in the pipe diameter downstream of the rotational element, which differs from prior art, causes that gas of equal rotating velocity is given a greater centrifugal force at the internal cylinder surface of the cyclone.

Experiments have shown that an axial cyclone according to the invention compared with axial cyclones according to prior art, under similar conditions, will demonstrate a considerably improved efficiency.

In the following a description of a non-limiting example of a preferred embodiment is given which is represented in the following drawing, where:

FIG. 1 shows an axial cyclone where a part of the mantel of the cyclone has been removed to illustrate the rotational element of the cyclone, and where the arrows indicate the is direction of flow through the cyclone.

In the drawings reference number 1 denotes an axial cyclone comprising, in the flow direction of the gas, an inlet pipe 2, a conical transitional component 4 and a downstream pipe 6. The downstream pipe 6 is supplied with a number of slots 8;

A rotational element 10, which comprises a number of axial vanes 14 distributed around the centre axis 12 of the axial cyclone, is placed in the conical transitional part 4, where the vanes project from a substantially common joint 16, where the joint 16 at inlet side 10 of the rotational element corresponds with the centre axis 12, primarily in a radial direction towards the mantel of the conical transitional part 4;

When gas and fluid droplets flow into the inlet pipe 2 and further into the rotational element 10, see arrows in FIG. 1, the in-flowing fluid assigns a rotation by the axial vanes 14. Simultaneously, the flow velocity of the fluid increases due to the reduction in cross-sectional area in the conical transitional part 4. Primary separation of the fluid droplets from the gas takes place in the downstream part 6 of the axial cyclone where the rotating movement of the gas around the centre axis 10 causes the, as compared with the gas, heavier fluid droplets to be slung out through the slots 8.

The invention claimed is:

1. A device for an axial cyclone of the kind which is used for separating a fluid from a gas, where the gas, during the flow through the axial cyclone, primarily in the axial direction of the axial cyclone, assigns a rotation around the center axis of the axial cyclone and where the axial cyclone in the direction of flow comprises an inlet pipe, a transitional part with a rotational element, and a downstream pipe, the cross-sectional area of the downstream pipe is smaller than the cross-sectional area of the inlet pipe, wherein said rotational element comprises axial vanes projecting from a substantially common center joint that corresponds with the center axis, said axial vanes projecting primarily radially outward in the direction of the internal surface of the axial cyclone, wherein said rotational element has a configuration that substantially avoids reduction of the cross-sectional flow area of said axial cyclone.

2. The device in accordance with claim 1 wherein the rotational element is located in the transitional part.

3. The device in accordance with claim 1 wherein the cross-sectional area of the rotational element in the flow direction is less than 20% the flow area of the axial cyclone.

* * * * *